No. 745,636. PATENTED DEC. 1, 1903.
M. LUSCOMB.
PRESSURE GAGE.
APPLICATION FILED SEPT. 23, 1898.
NO MODEL. 2 SHEETS—SHEET 1.
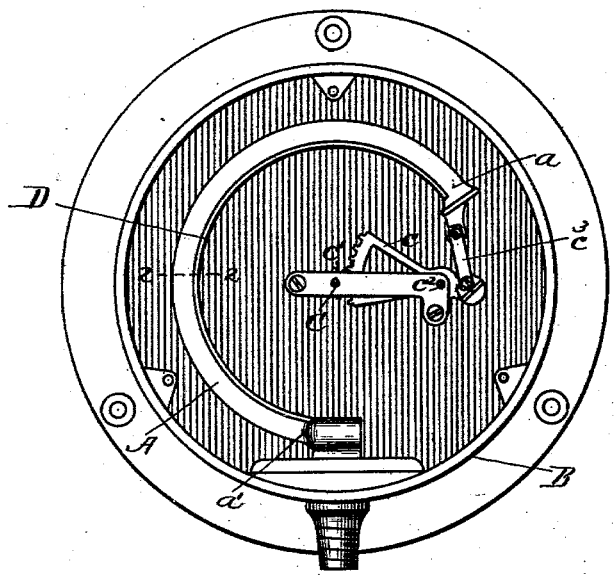
Fig. 1.
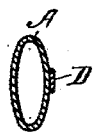 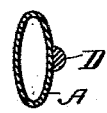  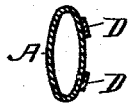
Fig. 2.   Fig. 3.   Fig. 4.   Fig. 5.
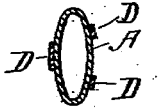 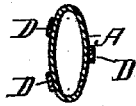 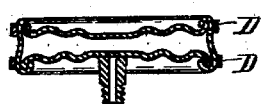
Fig. 6.   Fig. 7.   Fig. 8.
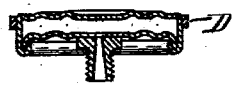
Fig. 9.
WITNESSES
W. S. Clarke
S. S. Dworkin
INVENTOR
Martin Luscomb No. 745,636. PATENTED DEC. 1, 1903.
M. LUSCOMB.
PRESSURE GAGE.
APPLICATION FILED SEPT. 23, 1898.
NO MODEL. 2 SHEETS—SHEET 2.

WITNESSES
W. R. Clarke
J. S. DeVorkin

INVENTOR
Martin Luscomb

No. 745,636. Patented December 1, 1903.

UNITED STATES PATENT OFFICE.

MARTIN LUSCOMB, OF BRIDGEPORT, CONNECTICUT.

PRESSURE-GAGE.

SPECIFICATION forming part of Letters Patent No. 745,636, dated December 1, 1903.

Application filed September 23, 1898. Serial No. 691,698. (No model.)

*To all whom it may concern:*

Be it known that I, MARTIN LUSCOMB, a citizen of the United States, and a resident of Bridgeport, in the county of Fairfield and State of Connecticut, have invented a new and useful Improvement in Pressure-Gages, of which the following is a full, clear, and exact description, reference being had to the accompanying drawings, forming a part of this specification, in explaining its nature.

The invention is especially applicable to the type of gage employing as a receiving and actuating instrumentality a Bourdon spring. Such gages are largely used for the measuring of steam-pressures.

The Bourdon spring is a delicate device, and while under fair conditions it is practically accurate in its action, yet the conditions of its use to-day have so changed as to make it less reliable than it heretofore has been. These changed conditions of its use are found first in the much heavier pressures which it is now called upon to receive and withstand and in the greatly-increased temperatures of the parts with which it is brought into contact or of the air which surrounds it in boiler and engine rooms and other places. Both of these extreme causes tend to produce irregularity in the action of the tube, which is quite likely to increase with the use of the gage. My invention seeks to restore and maintain the old accuracy of the tube under these new conditions by providing the tube with a means which overcomes the tendency of the tube to become inaccurate on larger pressures and at higher temperatures; and it consists in the application to the tube of one or more thin strips of spring steel or iron united to the tube and preferably upon the inner side thereof. The strip may or may not extend the full length of the tube and it may or may not be continuous.

Figure 10:
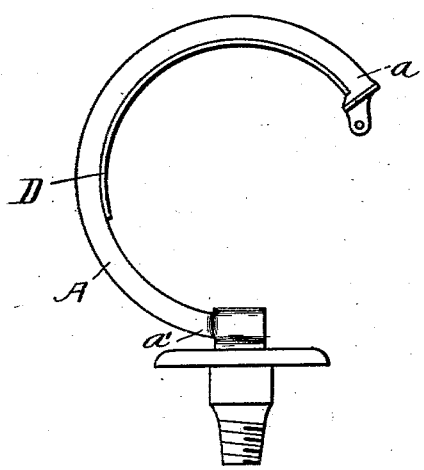
Figure 11:
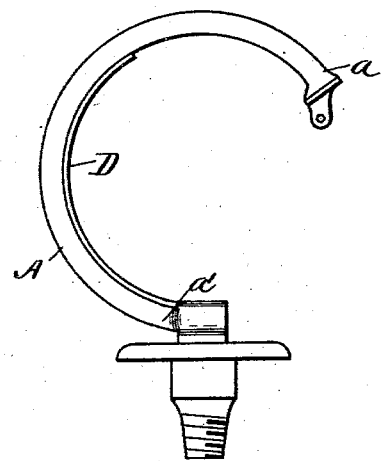
Figure 12:
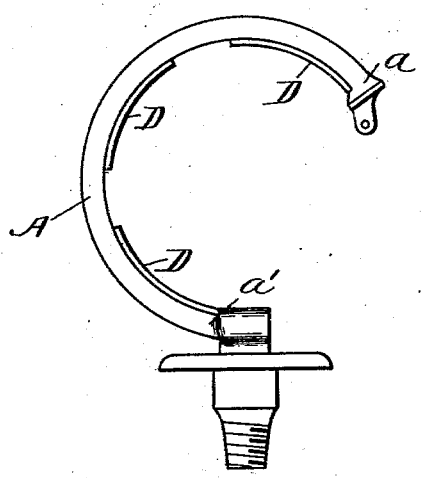

In the drawings, Figure 1 is a view of a steam-gage of my invention, the dial of the gage-case being removed to show the improved Bourdon tube therein and a part of the mechanism by which the movement of the free end of the tube is communicated to the indicator of the gage. Fig. 2 is a cross-section of the improved Bourdon spring upon the dotted line 2 2 of Fig. 1. Figs. 3 to 7, inclusive, represent cross-sections of improved Bourdon tubes, showing different applications of the coöperating strip or spring. Figs. 8 and 9 represent my invention as applied to the diaphragm of diaphragm-gages. Figs. 10, 11, and 12 represent modified types of the spring, to which reference is hereinafter made.

In the drawings, A represents the Bourdon tube. In Fig. 1 it is shown mounted in the gage-case B in the usual manner and as connected in one of the ordinary ways with the arbor or shaft C, upon which is mounted the indicating-hand of the gage, which is not shown. These connecting devices comprise a sector-gear $c$, the teeth of which mesh with a pinion $c'$ on the said shaft C, and the sector-gear is pivoted at $c^2$ and is connected by a link $c^3$ with the free end $a$ of the Bourdon tube.

D is a strip of spring metal, preferably steel or iron, though not necessarily so, which is made of the requisite temper, shape, and size to produce the required effect and which is secured to the Bourdon tube in any desirable way to provide for its coöperating or conjoint use with the tube in the preservation of its shape, action, and accuracy. The strip may be of any desired length, of any required section, and of any reasonable number, and it may be applied to any part of the tube between its ends or in sections between its ends or for the entire length of the tube.

In Figs. 1 and 2 the spring-strip is represented as rectangular in cross-section and as applied to the inner surface of the tube centrally thereon and as extending continuously from the base or fixed end $a'$ of the tube to its free end $a$.

In Fig. 3 the spring-strip is represented as semicircular in cross-section, but otherwise as like the strips of Figs. 1 and 2.

In Fig. 4 the spring-strip is represented as circular in section and as applied to the inner surface of the tube.

In Fig. 5 the tube is represented as having two spring-strips upon its inner surfaces, the strips being separated from each other.

In Fig. 6 the spring-tube is represented as provided with the spring-strips of Fig. 5 and an additional spring-strip upon the outer surface of the tube.

In Fig. 7 the tube is represented as having two spring-strips upon its outer surface and one upon its inner surface.

In Fig. 10 the spring-strip is represented as applied to the inner surface of the tube and as extending from the free end of the tube, but for only a portion of the length of the tube.

In Fig. 11 the spring-strip is represented as extending from the fixed end of the tube a portion of the length of the tube.

Fig. 12 represents the tube as having the spring-strip in three sections or parts.

In Fig. 8 gage-diaphragms are represented as combined with two spring-metal rings, which are continuous and completely surround them.

In Fig. 9 a single diaphragm is represented as supplied and combined with the spring-metal ring surrounding it, as in Fig. 8. The effect of the spring-strip ring on the diaphragm is similar to that of the spring-strip upon the Bourdon tube, for it serves to coöperate with the diaphragm in continuing the original properties of the diaphragm when subjected to a higher temperature and greater stress than that to which diaphragms have ordinarily been subjected.

The spring-strips may be united to the tube or diaphragm by brazing, soldering, or in any other desired way.

The invention may be applied to any type of Bourdon spring, and whether of one or more arms. It is not necessary that the spring-strip be secured directly to the tube, as it may be attached thereto by straps or other connections.

I am aware of English Letters Patent No. 2,383 of 1863, and I disclaim the invention therein described. I use one or more strips of steel or other metal which are narrow with respect to the width of the tube and are not intended to materially increase its resistance, but only to preserve its elasticity.

Having thus fully described my invention, I claim and desire to secure by Letters Patent of the United States—

In a pressure-gage a Bourdon tube made of a curved, hollow shape, active to the influences of pressure from within, having combined with it and forming a part of the tube, continuous, solid, spring-like metal differing from the metal of the tube and not so susceptible to a setting action under pressure and adapted to be moved by the tube in one direction so as not to appreciably affect the amplitude of deviation of the tube, and to restore the tube to its normal position when the tube is released from its actuating pressure, the size of the solid metal being such that said metal affects the amplitude of movement of the tube to an extent approximately equal to the extent to which the tube would set without it, the influence of said metal being so small that the side of the tube upon which it is attached is not material, the said hollow and solid parts of the tube being united together throughout the length of said solid part, as and for the purposes set forth.

MARTIN LUSCOMB.

In presence of—
W. R. CLARKE,
S. S. DE VORKIN.